United States Patent [19]

Cohen et al.

[11] Patent Number: 5,313,620
[45] Date of Patent: May 17, 1994

[54] SELECTIVE RECEIVER FOR EACH PROCESSOR IN A MULTIPLE PROCESSOR SYSTEM

[75] Inventors: David M. Cohen, Morristown; Bhaskarpillai Gopinath, Watchung; John R. Vollaro, Clinton, all of N.J.

[73] Assignee: Bell Communications Research, Inc., Livingston, N.J.

[21] Appl. No.: 724,194

[22] Filed: Jul. 1, 1991

Related U.S. Application Data

[63] Continuation-in-part of Ser. No. 335,116, Apr. 6, 1989, abandoned.

[51] Int. Cl.⁵ .............................................. G06F 1/04
[52] U.S. Cl. ................................ 395/550; 364/229; 364/229.2; 364/271; 364/271.2; 364/DIG. 1
[58] Field of Search ................ 395/550, 250; 364/200, 364/900

[56] References Cited

U.S. PATENT DOCUMENTS

| | | | |
|---|---|---|---|
| 4,494,190 | 1/1985 | Peters | 395/575 |
| 4,663,708 | 5/1987 | Taub | 395/325 |
| 4,833,638 | 5/1989 | Vollaro | 395/650 |
| 4,920,486 | 4/1990 | Nielsen | 395/325 |
| 5,179,661 | 1/1993 | Copeland, III et al. | 395/250 |

Primary Examiner—Robert L. Richardson
Assistant Examiner—Lance Leonard Barry
Attorney, Agent, or Firm—Leonard Charles Suchyta; Joseph Giordano

[57] ABSTRACT

Circuitry, and associated methodology in a parallel processing system for sharing the address space among a plurality of autonomous processors (110, 210, 310) communicating over a common bus (60) provides an efficient, non-destructive data transfer and storage environment. This is effected by augmenting each processor with a global clock (31), state alignment circuit (41, 42, 43) to synchronize the processors with the global clock buffers (140, 240, 340) for storing data received off the bus, and circuitry (130, 230, 330) for selectively enabling the buffer to accept those segments of data having addresses allocated to the given processor. To ensure that processing states are aligned, each state alignment circuit inhibits incrementing of the global clock until each corresponding processor transceives necessary data over the bus. To avoid overwriting of data during bus conflicts, the buffers are arranged to store data on a first-in, first-out basis and to control the processing states and data transfer in correspondence to respective bus and processor states.

5 Claims, 5 Drawing Sheets

SELECTIVE RECEIVER FOR EACH PROCESSOR IN A MULTIPLE PROCESSOR SYSTEM

CROSS-REFERENCE TO A RELATED APPLICATION

This is a continuation-in-part of application Ser. No. 07/335,116 filed Apr. 16, 1989, now abandoned.

Field of the Invention

This invention relates generally to multiple processor configurations and, more particularly, to circuitry and associated methodology for synchronizing the state changes of autonomous processors with selective reception by each of the processors of only pertinent portions of data that is broadcast over a communication bus interconnecting the processors.

BACKGROUND OF THE INVENTION

A programmable digital computer provides a readily adaptable environment to simulate physical systems such as a communication network or a multi-layer protocol. A system model, once described, can be analyzed extensively and then the model may be modified to study the effects of perturbations. Although there are numerous methods of simulation, they depart primarily in their details, not in their general characteristics. Most general purpose simulators exhibit the following essential characteristics: (1) the model, once activated from an initial condition, is represented by a series of events corresponding to changes in states of the model and, oftentimes, these changes are associated with particular instants of time in a simulated time environment; and (2) simulated time must not be affected by the time required to compute the events or state changes.

However, in order to make simulations tractable for complex systems, oftentimes it is necessary that parallel processing be utilized. With parallel processing, system computations are subdivided into tasks that are suitable for execution in parallel. The tasks are then distributed among a plurality of synchronized processors for autonomous execution. An inherent problem in the parallel approach, however, is the difficulty in ensuring that the computations, which are distributed among the processors for autonomous execution, are properly synchronized or aligned. As a simple example, it is supposed that two processors are executing in parallel and the first processor requires the results from the second processor. Then, the simulation must be arranged so that the second processor communicates its results to the first processor before the second processor may continue its computations; this is particularly important if the second processor completes its execution before the execution of the first processor is completed.

One recently disclosed approach to effecting state alignment was described in U.S. Pat. No. 4,833,638 issued May 23, 1989 to Vollaro. As disclosed in this patent, the processing states allocated to a plurality of autonomous processors comprising a multiple processor system are aligned by providing each processor with means for inhibiting a global reference generator within one unit of real time. The reference generator is restarted only after all task processing is completed in the order required by the sequence of changing states. To achieve maximum execution efficiency, the inevitable periods of long delay between scheduled states are detected and the system is advanced to the earliest, next scheduled state in a few, predetermined units of real time.

With respect to the specific processor computations during each of the processing states, the results have been conventionally stored in a single memory which is common to or shared among the several processors via a multiple access memory bus interconnecting the memory with the processors. Traditional methods for accessing and then storing computational data into the single memory possess inherent deficiencies. Two prime areas of difficulty are excessive loading of the memory bus and high overhead manifested by extra, unproductive processor cycles. Both of these factors may lead to unsuccessful access to the memory because of busy or blocking conditions exhibited by either the bus or the memory, or both simultaneously. The main cause of these difficulties is the constraint induced by the architectural arrangement, namely, the need to request and then acquire two shared resources (bus and memory) in series with some probability that access to each resource may fail due to blocking. In the case of a failure because of a busy condition, the entire access process must be continually repeated until access succeeds. The failure rate is exacerbated whenever the demand for memory access increases.

A so-called conflict, that is, a simultaneous update of the same memory location by two or more processors at the same instant of time, is another situation that is difficult to handle in shared memory systems. Multiple processors sharing the same data are called overlapping processes and the prevention of other processors from accessing shared data while one processor is doing so is called mutual exclusion. Several conventional techniques for implementing mutual exclusion, such as semaphores and test and set instructions, are detailed in the text entitled *An Introduction to Operating Systems*, by H. M. Ditel, Addison-Wesley, 1983, Chapter 4. These techniques also suffer from similar performance and overhead problems discussed above and, moreover, are extremely error-prone when handled by user-written software.

Finally, standard shared memory systems employ a destructive write process. Thus, when a memory location is modified, the contents of that location are replaced with the modified data and the original data is destroyed. This process, when combined with traditional conflict resolution techniques, basically obliterates the data history of each memory location, thereby either limiting the processor to using only the single data value presently stored in the memory location at the end of each computational phase or requiring elaborate recomputation procedures to reconstruct overwritten data.

There has been no teaching or suggestion in the art to synchronize time alignment of processing states with concurrency of data propagation.

SUMMARY OF THE INVENTION

The above-identified shortcomings and limitations of the conventional methods and associated circuitry for aligning processing states with the reception of data propagating on a bus interconnecting the processors in a multiple processor system are obviated, in accordance with the present invention, by providing each autonomous processor with state alignment circuitry for synchronizing the processing states of the autonomous processors, and shared variable circuitry for controlling each of the processors to selectively receive only pertinent segments of data propagating over the bus.

Broadly, uninterrupted data propagation is achieved since the state alignment circuitry synchronizes the autonomous processors to a single global reference signal. The global reference signal may be inhibited by any of the processors having data to propagate. Whenever the generator is inhibited, selective data reception is achieved by the shared variable circuitry including both buffer memory means and means for selectively enabling the buffer means to accept data on a first-in, first-out basis off the bus. The means for enabling stores information which is indicative of those segments of data that are required by the associated processor.

The organization and operation of this invention will be better understood from a consideration of the detailed description of the illustrative embodiment thereof, which follows, when taken in conjunction with the accompanying drawing.

DETAILED DESCRIPTION

Overview

Figure 1:
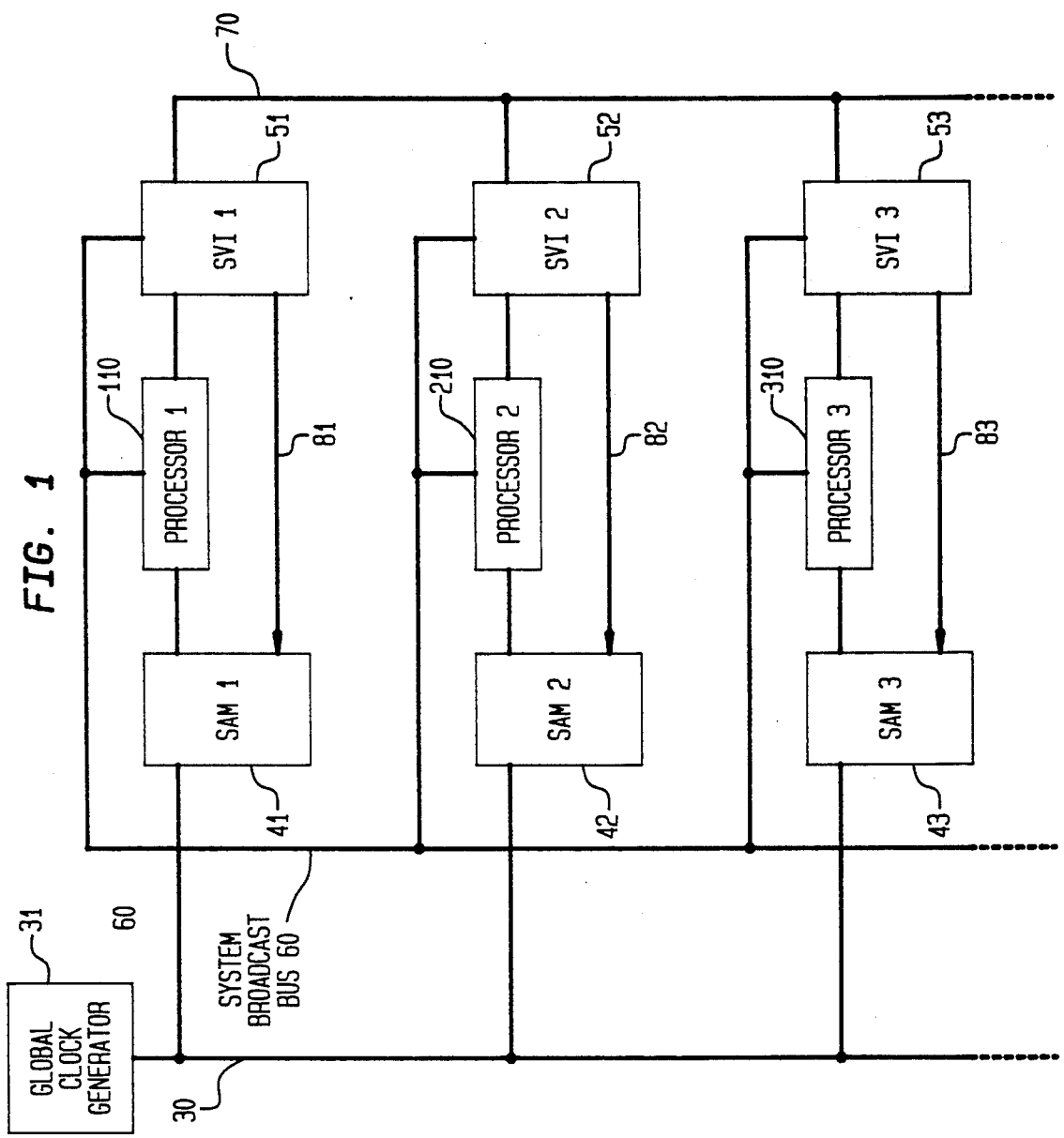
FIG. 1 is a block diagram of the overall uninterrupted bus cycle system depicting three processors interconnected to three system busses—clock, broadcast, control—through the state alignment modules and the shared variable interfaces.

The overall architecture of system 20 in accordance with the present invention is first described in terms of the block diagram shown in FIG. 1. System 20 is arranged to interconnect an arbitrary number of processors 110, 210, 310, . . . together through three busses 30, 60 and 70. The processors may include a diverse mixture of general or special purpose devices with different speed and timing characteristics. The only common requirement is that each processor provide suitable interfaces to: (i) State Alignment Modules (SAMs) circuits 41, 42, 43, . . . connected to corresponding processors 110, 210, 310, . . ., respectively; (ii) Shared Variable Interfaces (SVIs) circuits 51, 52, 53, . . . also connected to associated processors 110, 210, 310, . . ., respectively; and (iii) bus 60. The SAMs serve to synchronize the processing states of the processors. The SVIs serve to effect data concurrency among the processors. The SVIs connect to busses 60 and 70 and the SAMs connect to bus 30. Bus 60 is a system broadcast bus for data transfer among the processors. For instance, bus 60 may be implemented as the VME-type bus well-known in the computer art. Bus 70 is a path for maintaining data consistency and for providing flow control among the processors. Bus 30 is the path for distributing and controlling global reference signals generated by global clock generator 31. The global clock signal on bus 30 provides a common, synchronous clock source that is received simultaneously by each SAM. Finally, SVIs 51-53 are coupled to SAMs 41-43 via control leads 81-83, respectively. This arrangement of system 20 in accordance with the present invention effects an uninterrupted bus cycle so as to globally synchronize the processors and achieve data concurrency.

ILLUSTRATIVE EMBODIMENT

Although system 20 of FIG. 1 is explicitly depicted with three autonomous processors 110, 210, and 310 from a multi-processor system, the focus of the remaining discussion is on a single processor, say processor 110 and its concomitant SAM 41 and SVI 51, since each of the SAMs is substantially identical to other SAM circuits, and each of the SVIs is substantially identical to other SVI circuits.

Figure 2:
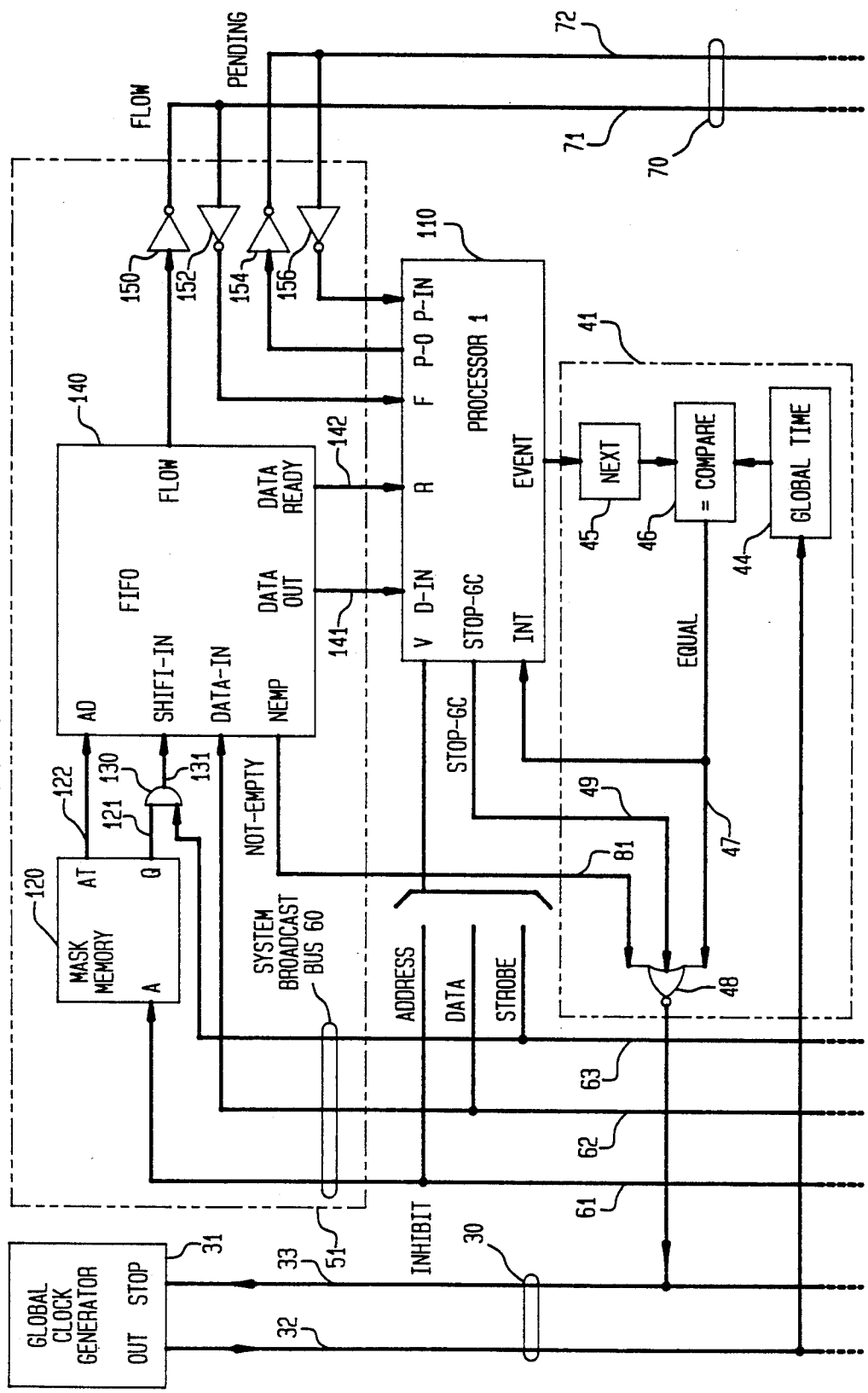
FIG. 2 is a block diagram of a first processor depicting its relation to its corresponding state alignment modules and its associated shared variable interfaces.

As now depicted in FIG. 2, global clock generator 31 generates successive reference signals and outputs these signals on lead 32 of bus 30. Generator 31 can be disabled by an INHIBIT signal appearing on lead 33 of bus 30. Lead 33 implements "wired-OR" logic, that is, a logic 0 is the dominant state on lead 33 so that any processor, via its corresponding SAM, which causes a logic 0 to be asserted on lead 33 may deactivate clock generator 31. The manner in which each SAM controls lead 33 is discussed in below.

SAM 41 includes two registers, namely, GLOBAL TIME register 44 and NEXT register 45. Register 44 increments synchronously on the reception of each reference signal via lead 32 from clock 31. Register 45 is loaded by processor 110, via the EVENT port, with a value that determines when, in the course of execution, data information representative of a calculated state change is to be propagated on system bus 60. The value of register 45 is continuously compared to the increasing value of register 44 in comparator 46. When the contents of register 44 equal the contents of register 45, a comparison signal appears on lead 47 (EQUAL) indicating equality of the register contents of both registers. The comparison signal, which is a logic 1 signal, is passed through NOR gate 48 to lead 33 as a logic 0, thereby inhibiting clock 31 because of the dominant state on wired-OR lead 33; in addition, the comparison signal on lead 47 serves to interrupt processor 110 via its INT port. Processor 110 now proceeds with transmission of data information, also referred to as shared variables, during this suspension of clock 31. Thus, as clock 31 increments, the state activity effected by each processor 110, 210, and 310 is triggered according to the values loaded into the respective NEXT registers.

SVI 51 includes mask memory 120, first-in, first-out (FIFO) buffer 140 and AND gate 130; such an arrangement of circuitry effects a distributed, shared address space. Memory 120, gate 130 and FIFO 140 each are coupled to bus 60. In particular, memory 120 is coupled to parallel address (ADDRESS) sub-bus 61, whereas gate 130 is connected to STROBE lead 63 and FIFO 140 has parallel DATA sub-bus 62 as input.

Each processor 110, 210 and 310 of FIG. 1 operates in essentially an autonomous mode, that is, in the sense that each processor is composed of an internal clock (not shown) which is independent of the clocks in all other processors. Although the processors operate autonomously, the processors form a parallel processing system having a need to interact such as, for example, by transmitting information generated by or stored in one processor to certain other processors requiring that information; computational data from executed tasks is one form of the information requiring transmission. This is effected over bus 60 in a conventional manner; for the VME-type arrangement, an interrupt signal is the indicator of a transmit ready condition for the broadcasting of information by one or more processors.

Broadly, as is depicted in FIG. 2, a separate copy of the data information broadcast over bus 62 may be stored by FIFO 140 of SVI 51, as well as the other FIFOs in other SVIs. When data is written on bus 62, the data is registered simultaneously in each enabled FIFO. Hence, in contrast to the conventional single memory implementation, the arrangement in accordance with the present invention utilizes replicated, distributed FIFO buffers that are selectively enabled to receive data on bus 62. This makes it possible for each processor to accept only the data that is pertinent to its tasks from the composite data broadcast over bus 62. Once copied, reading of the data by any particular processor may occur asynchronously and in parallel from its associated private copy.

To succinctly describe the uninterrupted bus cycle, it is first necessary to describe the technique of selectively enabling SVI 51, which is representative of other SVIs. Initially, mask memory 120 is illustratively a one bit wide memory having its address input (A) connected to bus 61. Memory 120 stores an enable bit at each address which is pertinent to its associated processor 110. The output (Q) of memory 120 serves as one input to AND gate 130 via lead 121. The other input to gate 130 is STROBE lead 63 of bus 60. The STROBE signal indicates when data is stabilized and may be read off bus 60. The output of gate 130, on lead 131, serves to enable the SHIFT-IN input of FIFO 140. With this coupling arrangement, the one bit of mask memory 120, when ANDed with the FIFO write signal, allows FIFO 140 to selectively receive the data presented to its DATA-IN port. Since a given processor usually requires only a limited portion of the broadcast data, the AND operation effectively filters unwanted data under control of the contents of memory 120. Moreover, this arrangement of FIFO 140 effects non-destruct write operations. Since every data update is stored when received on a first-in, first-out basis, processor 110 has available a history of variable changes. For instance, it is supposed that there are two successive writes to an enabled memory location by processors 210 and 310, respectively, of FIG. 1. Because of interposed FIFO 140, the two data segments are stacked in FIFO 140. Now, if a conflict is detected (as discussed shortly), the fact that successive segments of data have been written to the same address and, consequently, are stored serially in FIFO 140, allows for conflict resolution according to an algorithm that is appropriate to the process being executed.

With reference to components 154 and 156 of FIG. 2, conflicts are detected by asserting lead 72 (PENDING), via inverter 154 connected to processor 110. PENDING is asserted by processor 110 whenever an interrupt is received at the INT port of processor 110, that is, whenever the EQUAL comparison signal is generated by comparator 46 in SAM 41. Lead 72 is arranged to have a "wired-OR" characteristic, that is, each processor connected to bus 70 can force PENDING to its dominant state or logic 0 state. The PENDING signal of logic level "1" is transmitted from the P-O port of processor 110 to inverter 154, and the PENDING signal on lead 72 is received at the P-IN port via inverter 156. Thus, PENDING is asserted by any processor having a scheduled next event at the start of a standard contention cycle on bus 60. The PENDING signal from each processor is released only after the processor has no remaining data to transceive. If multiple processors are queued and waiting to use bus 60, PENDING is asserted from the beginning of the first request for access to system bus 60 until the completion of the transmission of data information by the last processor in the queue.

Figure 3:
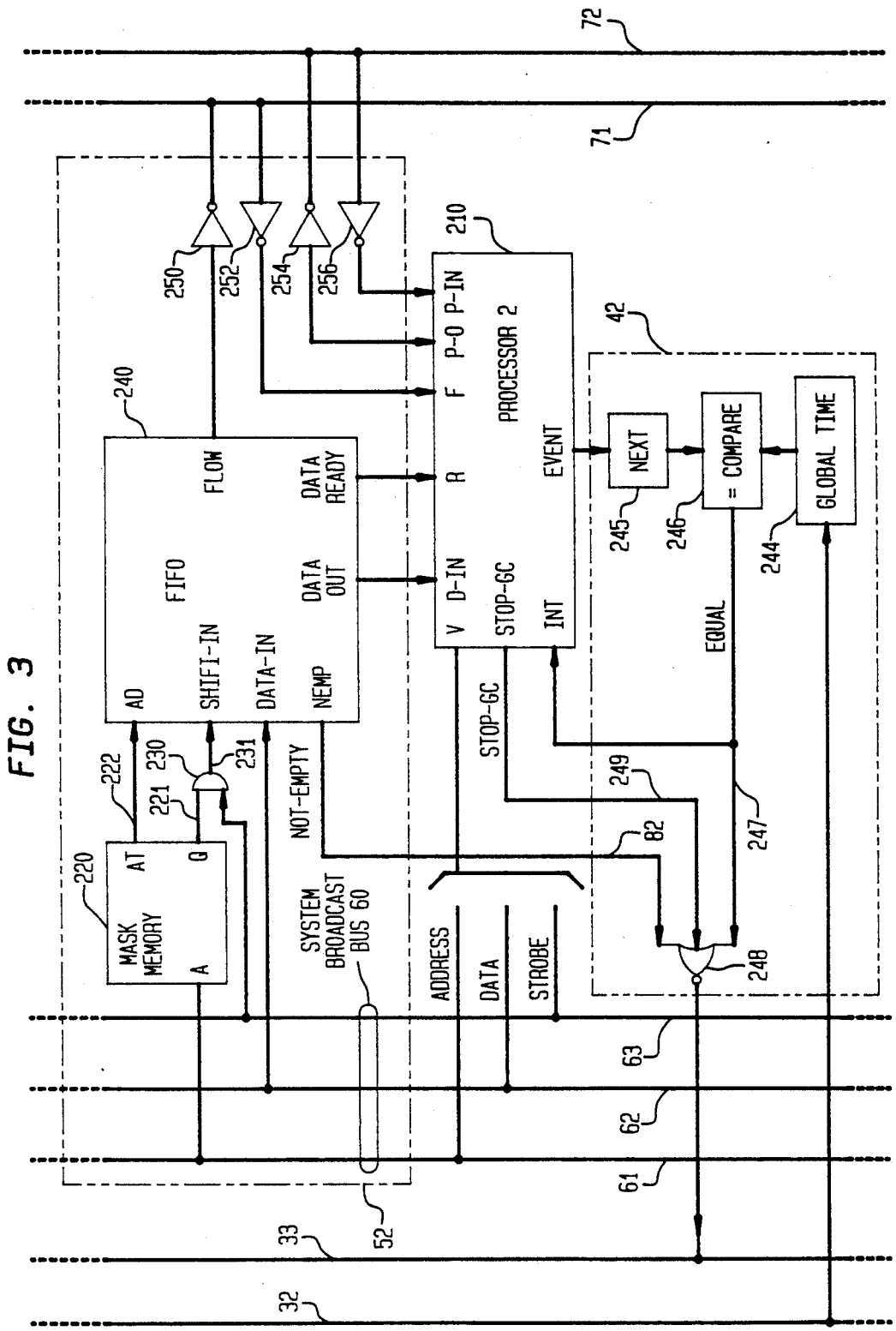
FIG. 3 is a block diagram of a second processor depicting its relation to its corresponding state alignment modules and its associated shared variable interfaces.
Figure 4:
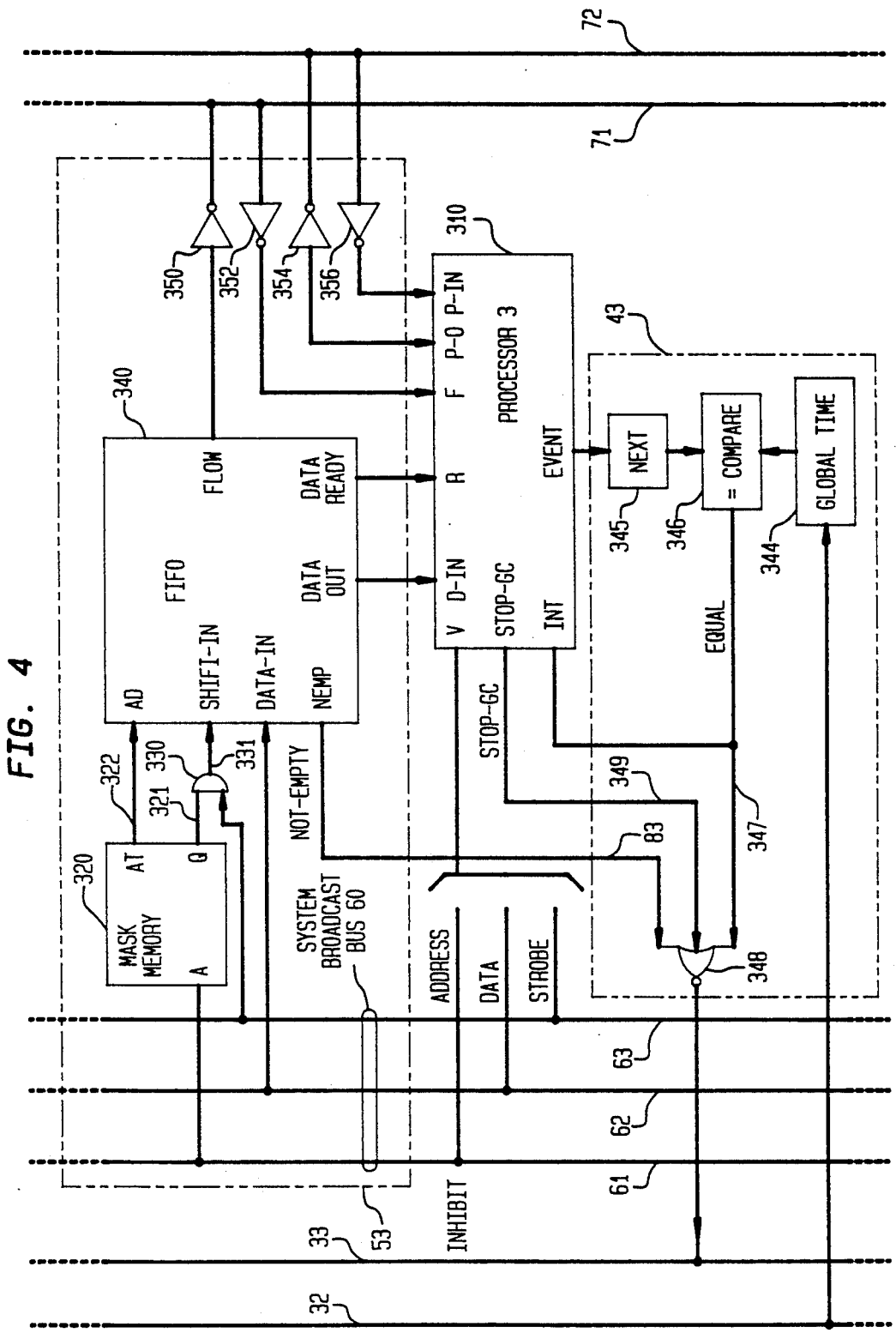
FIG. 4 is a block diagram of a third processor depicting its relation to its corresponding state alignment modules and its associated shared variable interfaces.

By way of an illustrative operational description of a complete uninterrupted processing cycle involving the processors, the SAMs, and the SVIs, the relatively simple case of only processor 110 having data information to propagate to both processors 210 and 310 as the next scheduled event in the parallel processing environment is now considered. Reference is made to FIGS. 2-4 during this description; these figures correspond to processors 110, 210 and 310, respectively, and represent an exploded view of the block diagram of FIG. 1.

As a starting point to this description, with reference to FIG. 2, it is assumed that NEXT register 45 had previously been loaded with the next scheduled event, and a comparison signal has just been generated by comparator 46 in corresponding processor 110. Furthermore, it is presumed that processor 110 has data information, in the form of shared data variables, to transmit to both processors 210 and 310. In particular, the first and last variables (say, variable numbers one and one hundred) are to be selectively received by processor 210 and the remaining data variables (two through ninety-nine) are to be selectively received by processor 310.

The comparison signal generated on lead 47 (EQUAL) causes lead 33 (INHIBIT) to be asserted via NOR gate 48, thereby inhibiting generator 31. Also, the INT port of processor 110 receives the comparison signal, and processor 110 responds by: (i) transmitting a logic 1 level, via its P-O port, to inverter 154, thereby asserting lead 72 (PENDING) to signal processors 210 and 310 that (for this simple case of just three processors) processor 110 has data to transmit; and (ii) transmitting a logic 1 level, via its STOP-GC port, to NOR gate 48 to independently assert INHIBIT lead 33. STOP-GC is used to inhibit clock 31 so that NEXT register 45 may eventually be loaded with the next scheduled state without relinquishing the hold on clock 31. Then processor 110 contends for VME bus 60; for this case, processor 110 is the only processor having data to transmit, so processor 110 begins sending data over bus 60. The first data information transmitted is shared variable number one, which is destined for processor 210.

Referring now to FIG. 3, mask memory 220 in SVI 42 has an enable bit at the address associated with variable number one. Thus, this address causes the Q output of memory 220 to emit a logic 1, thereby selectively enabling the data information on bus 60 to be strobed, via gate 230 asserting the SHIFT-IN port, into the DATA-IN port of FIFO 240. FIFO 240 responds by sending a DATA READY signal to processor 210 and by simultaneously sending a logic I level as a hardware interrupt over NOT-EMPTY lead 82, via the NEMP port, to NOR gate 248. This logic 1 also serves to inhibit clock 31 via INHIBIT lead 33. Accordingly, at this stage, INHIBIT lead 33 has been asserted by three logic 0 levels, two (EQUAL and STOP-GC) being derived from processor 110 and one (NOT-EMPTY) from processor 210. Processor 210 cannot advance to its next scheduled state as stored in its NEXT register because clock 31 is inhibited. Processor 310 has not selectively received any data yet, but processor 310 senses that PENDING is asserted, so it awaits the possibility of receiving data. Processor 310 cannot advance to its next scheduled state because clock 31 is inhibited. Processor 210 handles the DATA READY interrupt signal on the priority basis assigned to FIFO processing.

Processor 110, during this same time frame, is transmitting shared variable number two over bus 60; processor 310 is presumed to be the only one enabled to receive this variable. Referring now to FIG. 4, FIFO 340 associated with processor 310 selectively receives the shared variable information (variables 2 through 99) propagated by DATA sub-bus 62. A NOT-EMPTY logic 1 level is generated by FIFO 340 associated with processor 310, thereby providing another INHIBIT signal to lead 33, via lead 83, to NOR gate 348. Also, the DATA READY interrupt is received by processor 310 to extract data from FIFO 340. In a similar fashion, shared variables three through ninety-nine are transmitted over bus 60 and selectively received by FIFO 340 associated with processor 310. If it is presumed that processor 210 finishes processing its associated FIFO 240 during the interval of propagation of the shared variables two through ninety-nine over bus 60, then the NEMP port of processor 210 is released, thereby releasing one of the holds on INHIBIT lead 33 through NOR gate 248. The INHIBIT lead is still asserted by three logic 0 levels, namely, the EQUAL and STOP-GC derived from processor 110 and the NOT-EMPTY derived from processor 310.

Even though processor 210 is finished servicing its associated FIFO 240, the PENDING lead is still asserted by processor 110—it still has to transmit shared variable one hundred to processor 210. This assertion of PENDING indicates to processor 210 that is must wait for the possibility of receiving other data variables, and typically no processing of the first shared variable can commence yet. This is because all of the data associated with a given state change usually must be available before the state is resolved.

Processor 110 now transmits the last shared variable (one hundred) over bus 60, and this variable is now selectively received by processor 210 because mask memory 220 has an enable bit at the address associated with the shared variable information. Again, FIFO 240 associated with processor 210 shifts-in the data information, and sends the DATA READY interrupt signal to processor 210 and the NOT-EMPTY logic 1 level to its NOR gate 248 so as to independently INHIBIT clock 31. The INHIBIT lead is now presumably asserted by all three processors—EQUAL and STOP-GC of processor 110, and NOT-EMPTY of both processors 210 and 310. Since processor 110 has transmitted all of the shared variables, it will release PENDING by sending a logic 0 level to its inverter 154 via the P-O port. If it is presumed that processor 310 finishes servicing its FIFO 340 and has downloaded the shared variables selectively received over bus 60, then the NOT-EMPTY signal from processor 310 is released. The INHIBIT lead 33 is now held by three signals—EQUAL and STOP-GC of processor 110 and NOT-EMPTY of processor 210. Processor 310 senses the release of PENDING lead 72, through inverter 356 connected to its P-IN port, and may begin to process the selectively received variables.

Eventually processor 210 finishes servicing its associated FIFO 240, and its associated NOT-EMPTY is released. The INHIBIT lead 33 is now only held by the EQUAL and STOP-GC logic levels emitted by processor 110. Since PENDING is released, processor 210 may also begin processing its received shared variables.

Processor 110 loads NEXT register 45 with the next scheduled event, so that the EQUAL comparison signal on lead 47 generated by processor 110 is released. Now, only STOP-GC of processor 110 asserts the INHIBIT lead 33. As the final activity for this uninterrupted bus cycle, processor 110 releases STOP-GC by transmitting a logic 0 level from its STOP-GC port. This releases the INHIBIT lead, and clock 31 may now advance until another comparison signal re-asserts lead 33.

Since the three processors are autonomous, with the possibility of different internal processing speeds, other variations on the above operational description are possible. For instance, it was presumed for the foregoing description that processor 310 finished servicing FIFO 340 interrupt before processor 210 finished servicing FIFO 240 interrupt and before processor 110 loaded its NEXT register 45 with the next scheduled event and released STOP-GC. If the presumption is changed so that processor 310 is the last to finish processing, then its NOT-EMPTY lead 83 would remain asserted, thereby placing an INHIBIT on clock 31. Thus, processors 110 and 210 are relegated to wait states until INHIBIT is released by processor 310.

No matter which variation is considered, the outcome is always the same, namely, the processors cannot advance to the next state until all processors have transmitted their pertinent shared variables, and the processors which selectively received the shared variables have serviced their associated FIFO's. Any race conditions have been eliminated and an atomic or uninterrupted bus cycle has been effected. This assures that all relevant data has been received, even conflicting data. The processors are then able to initiate conflict resolution routines, being assured that all pertinent data is available for processing. The conflict resolution scheme for each processor, since the scheme is not hard-wired, may be implemented as appropriate for each application. For instance, one resolution scheme may deal with the conflict by taking the first update and discarding all others; another scheme may be to average the data. (In each of these instances, it is possible for a given processor to initiate processing even before all data has been received since these schemes are not dependent on the reception of all data.)

In any processing situation wherein the FIFO buffers may be filled at a faster rate than they are emptied, a flow control mechanism is provided to preclude FIFO overflow. The FIFOs are configured to provide a signal on their FLOW port, as exemplified in FIG. 2 for FIFO 140, whenever the FIFOs are filled to a predetermined threshold. The FLOW port is connected to FLOW lead 71 via, for example, inverter 150 for FIFO 140. In turn, lead 71 connects to all other processors via, for example, the F port of processor 110 through inverter 152. Lead 71 is also arranged to have a "wired-OR" characteristic. Whenever the FLOW port from any FIFO is asserted, processors that have pending asserted receive and process an interrupt through the F port which is indicative of the threshold being exceeded. Servicing of this interrupt receives the highest level priority, whereas servicing of EQUAL lead 47 is the next highest priority level, with servicing of the FIFO DATA READY interrupt being the lowest priority level. Whenever lead 71 is asserted, such as by detecting that at least one FIFO 140, 240, 340, . . . is more than half-full, propagation of shared variables is suspended until all processors process the contents of their associated FIFOs below the threshold storage level before allowing additional data transmission.

It is to be understood that the above-identified arrangements are simply illustrative of the application of the principles in accordance with the present invention. Other arrangements may be readily devised by those skilled in the art which embody the principles of the present invention and fall within its spirit and scope. Thus, for example, it is possible to configure each shared address space circuitry (e.g., elements 120, 130 and 140 of FIG. 2) so that an address translation may be effected between addresses on bus 60 and local memory in FIFO 140. In this situation, mask memory 120 is an N+1 bit wide memory wherein one of the bits is used in conjunction with gate 130 for activating data strobing and the remaining N bits indicate the address in local memory allocated to store the data. These N bits are passed to, for example, the AD port of FIFO 140 from the AT port of memory 120 via bus 122.

Also, whereas the contents of mask memory 120 as described are static, it is possible to dynamically alter its contents by also arranging memory 120 with an enable input so as to receive data off bus 60 to modify its contents.

Moreover, whereas SVIs 41-43 are shown as connecting to SAMs 51-53 via leads 81-83, respectively, so as to separately inhibit clock 31 through gates 48, 148, and 248, it is possible to inhibit clock 31 directly by propagating the NOT-EMPTY signal from each FIFO through a "wired-OR" inverter to lead 33.

Figure 5:
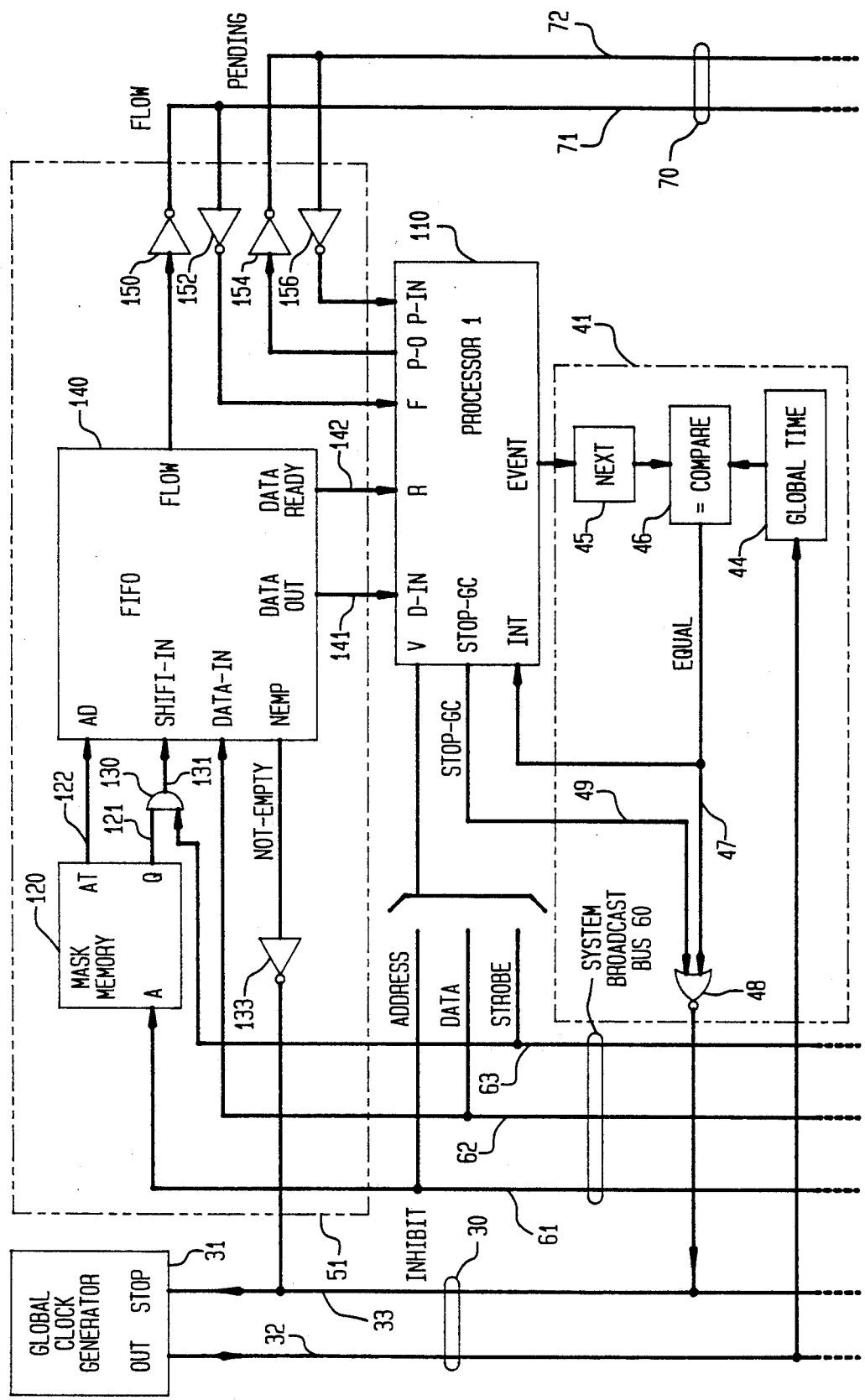
FIG. 5 is an alternative realization to the arrangement shown in FIG. 2 wherein the clock is directly inhibited by the state alignment module.

In addition, as depicted in FIG. 5, it is also possible to directly inhibit lead 33 from the NEMP port of FIFO 140 via interposed inverter 133 by having lead 81 serve as the input to inverter 133; inverter 133 couples to lead 33 as a "wired-OR." This is in contrast to using the signal on lead 81 as one input to gate 48 as shown in FIG. 2. The NEMP ports of FIFOs 214 and 340 in FIGS. 3 and 4, may also be similarly connected to lead 33.

Therefore, it is to be further understood that the circuitry and methodology described herein is not limited to specific forms disclosed by way of illustration, but may assume other embodiments limited only by the scope of the appended claims.

What is claimed is:

1. Circuitry in combination with a plurality of processors and a system broadcast bus which interconnects the processors and which propagates address information and data information, said circuitry comprising
   means for generating successive reference signals,
   a first control bus for propagating said reference signals,
   a second control bus for propagating a pending signal,
   a plurality of substantially identical synchronization circuits each coupling a corresponding one of the processors to said first control bus, and
   a plurality of substantially identical shared variable circuits each connected to a corresponding one of said synchronization circuits, and coupling the corresponding one of the processors to the system broadcast bus and to said second control bus,
   said each of said synchronization circuits comprising:
   means, coupled to the corresponding processor, for storing a quantity indicating a next processing event as communicated by the corresponding processor;
   means, responsive to said means for generating said reference signals, for registering said reference signals;
   means, coupled to said storing means and said registering means, for comparing said quantity indicating a next processing event stored in said storing means to said reference signal registered in said registering means to provide a comparison signal whenever said contents are equivalent;
   first means, coupled to said comparing means, for inhibiting said means for generating said reference signals whenever said comparison signal is asserted and for notifying the corresponding processor upon detection of said comparison signal; and
   second means, coupled to the corresponding processor, for inhibiting said means for generating said reference signals in response to said comparison signal being processed by the corresponding processor,
   said each of said shared variable circuits comprising:
   buffer means, coupled to the system bus and having a first output connected to the corresponding processor and a second output coupled to said means for generating said reference signals, for storing the data information propagating on the system bus as local data and for interrupting the corresponding processor by asserting said first output so as to transmit said local data to the corresponding processor whenever said local data is stored in said buffer means, and for inhibiting said means for generating said reference signals by asserting said second output whenever said buffer means stores said local data;
   mask memory means, coupled to the system bus and having its output connected to said buffer means, for detecting the address information on the system bus and for enabling said buffer means to store the data information propagating on the system bus as said local data whenever the address information registers in said memory means as being assigned to the corresponding processor; and
   pending means, coupling the corresponding processor to said control bus, for generating a pending signal on said control bus responsive to said comparison signal received by the corresponding processor to communicate to all other processors that the corresponding processor has data information to transmit on the system bus.

2. The circuitry as recited in claim 1 wherein said second control bus propagates a flow control signal, and said each of said shared variable circuits includes a buffer content level detection means and flow control means, coupling the corresponding processor to said second control bus, for generating a flow control signal on said control bus to stop the transceiving of all data information by all processors whenever said buffer means exceeds a predetermined threshold storage level determined by said buffer content level detection means.

3. The circuitry as recited in claim 1 wherein said each of said shared variable circuits includes means for deactivating said pending signal component whenever the corresponding processor has completed transceiving of the data information.

4. The circuitry as recited in claim 3 wherein each of said synchronization circuits includes means for deactivating said comparison signal whenever said means for storing is updated by the corresponding processor.

5. The circuitry as recited in claim 4 wherein each of said synchronization circuits includes means for deactivating said second means for inhibiting whenever the corresponding processor completes all processing of said buffer means and completes the transceiving of its data information.

* * * * *